United States Patent [19]

Abe

[11] Patent Number: 4,580,184

[45] Date of Patent: Apr. 1, 1986

[54] TAPE CASSETTE

[75] Inventor: Shuichi Abe, Mito, Japan

[73] Assignee: Victor Company of Japan, Ltd., Yokohama, Japan

[21] Appl. No.: 470,711

[22] Filed: Feb. 28, 1983

[30] Foreign Application Priority Data

Mar. 10, 1982 [JP] Japan .............................. 57-33716[U]

[51] Int. Cl.⁴ ............................................. G11B 23/02
[52] U.S. Cl. .................................... 360/132; 206/387
[58] Field of Search ....................... 360/132; 206/387; 242/194, 197–200

[56] References Cited

U.S. PATENT DOCUMENTS 4,494,161 1/1985 Ogata .................................. 360/132

FOREIGN PATENT DOCUMENTS 7930975 4/1980 Fed. Rep. of Germany .

*Primary Examiner*—A. J. Heinz
*Attorney, Agent, or Firm*—Louis Bernat

[57] ABSTRACT

A tape cassette comprises a cassette case for accommodating a tape therein, an angularly rotatable lid provided at a front of the cassette case, where the lid is free to open and close, and a mechanism for maintaining the lid in an open state and a closed state, respectively. The mechanism comprises a slide rod making contact with an outer peripheral surface of the lid in the vicinity of a rotary fulcrum of the lid, a leaf spring for urging the slide rod towards the outer peripheral surface of the lid so as to make contact with the outer peripheral surface, a first groove provided in a side of the cassette case, into which the slide rod is slidably fitted, a second groove provided in a side of the cassette case for accommodating the spring member, into which a rear part of the slide rod can enter to permit sliding of the slide rod, and a rib portion integrally formed with the cassette case. The rib portion projects to cover a part of a side of the second groove at least at a position opposing a side of the slide rod fitted within the first groove, and the slide rod is prevented from escaping from the first groove by the rib portion.

5 Claims, 13 Drawing Figures

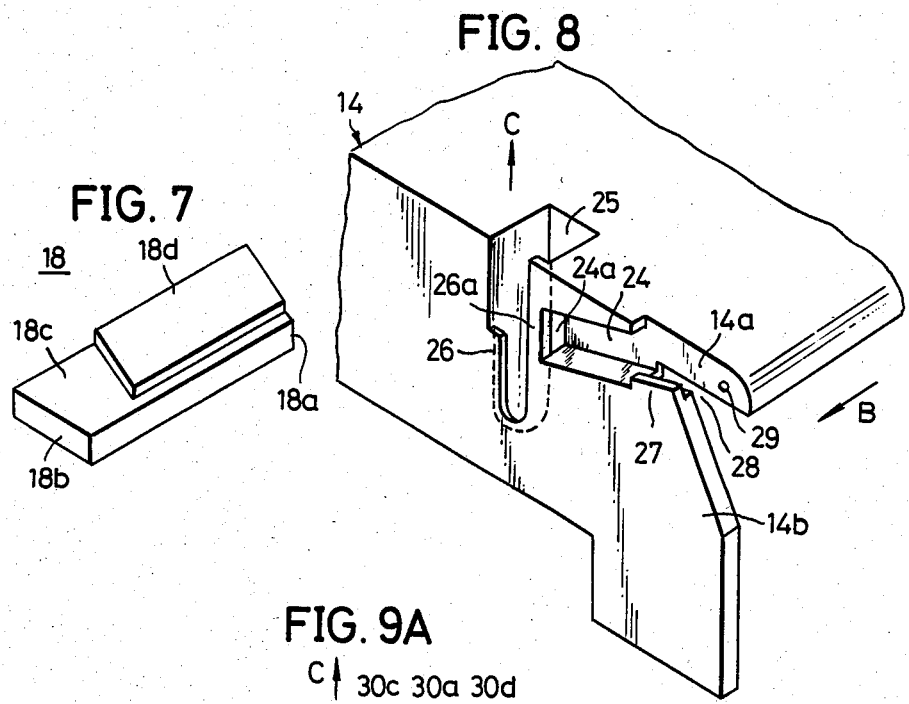
FIG. 7
FIG. 8
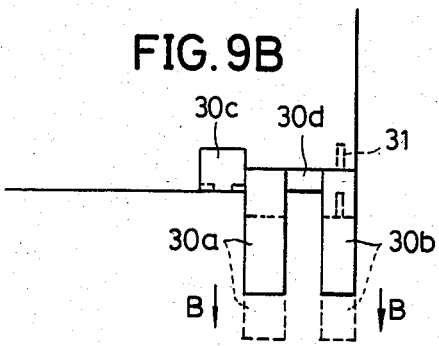
FIG. 9A
FIG. 9B

TAPE CASSETTE

BACKGROUND OF THE INVENTION

The present invention generally relates to tape cassettes, and more particularly to a tape cassette provided with a lid which closes to protect a tape extending along the front of a cassette case when the tape cassette is not used, and an improved mechanism for maintaining the lid in the closed state and open state.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed.

Recently, a problem of much importance involves the realization of a downsized recording and/or reproducing apparatus main body. This is to develop a more compact portable type recording and/or reproducing apparatus, and, for example, to realize such an equipment that a recording apparatus is unitarily built into a television camera.

In this regard, an exceedingly downsized tape cassette was proposed in a U.S. Patent Application Ser. No. 339,675 filed Jan. 15, 1982 (now U.S. Pat. No. 4,494,161) entitled "TAPE CASSETTE" in which the assignee is the same as that of the present application, and this downsized tape cassette is now reduced to practice. When using this proposed tape cassette with respect to the standard type recording and/or reproducing apparatus, this tape cassette is used in a state accommodated within a tape cassette adapter having an external form and size identical to those of the standard type tape cassette. On the other hand, when using this proposed tape cassette with respect to a compact type recording and/or reproducing apparatus, this tape cassette is used in a state as it is without the tape cassette adapter.

The above proposed tape cassette which has been reduced to practice, comprises a lid which closes to protect a tape extending along the front of a cassette case when the tape cassette is not used, and opens to a position not interfering with the drawing of tape out from the cassette case when the tape cassette is used, wherein the lid is of a design comprising a mechanism for maintaining the lid in the closed state and the open state. According to this tape cassette, when accommodating the tape cassette into the tape cassette adapter prior to being used with respect to the standard type recording and/or reproducing apparatus, there is no need to hold the lid in the open state by a finger because the lid is maintained in the open state once the lid is opened. Hence, the tape cassette can easily be accommodated within the tape cassette adapter in a state where the lid is in the open state, and further, the tape can be drawn outside the cassette case with ease.

As will be described hereinafter in conjunction with the drawings, the mechanism for maintaining the lid of the tape cassette in the closed state and the open state comprises a slide rod slidably provided on a side surface of the cassette case in a state making contact with the peripheral surface of the lid at a part in the vicinity of a rotary fulcrum of the lid, and a spring for urging the slide rod towards a direction so as to make contact with the peripheral surface of the lid. However, the above slide rod is simply fitted into a groove open at the side surface of the cassette case, and there was a disadvantage in that the slide rod could easily escape from the groove.

Accordingly, in order to prevent the slide rod from escaping from the groove in the cassette case, a design was tested wherein the groove is shaped as a dovetail groove and the slide rod is shaped to have a trapezoidal cross section. However, if a cassette case having such a design is to be molded from plastic and the dovetail groove is to be formed integrally, the mold must be pulled along the extension of the dovetail groove. On the other hand, holes in the cassette case for supporting hinge pins of the lid extend along a direction perpendicular to the direction in which the mold for forming the dovetail groove is pulled. Therefore, it is impossible to integrally form the dovetail groove and the holes for supporting the hinge pins of the lid simultaneously, when molding the cassette case.

Hence, it becomes necessary to integrally form the dovetail groove when molding the cassette case, and thereafter form the holes for supporting the hinge pins of the lid by an additional process such as a drilling process for drilling the holes. The number of processes required for forming the cassette case increased because of this additional process which was required, and it was troublesome to carry out this additional process to form the holes. Further, errors were introduced in the drilling positions and the like for forming the holes, and accordingly resulted in defective cassette cases. Therefore, there were disadvantages in that the working factor and the production efficiency in manufacturing the cassette case became poor, and the manufacturing cost of the cassette case became high.

Another design was tested wherein the slide rod is connected to the spring. However, the construction of the cassette case became complex according to this design, and the assembling work factor became poor. In addition, there was a disadvantage in that the slide rod could not be completely prevented from escaping from the groove in the cassette case.

SUMMARY OF THE INVENTION

Accordingly, it is a general object of the present invention to provide a novel and useful tape cassette in which the above described disadvantages have been eliminated.

Another and more specific object of the present invention is to provide a tape cassette designed so that a groove into which a slide rod urged by a spring to slide according to open and closed states of a lid is slidably fitted, can easily be formed integrally together with holes for supporting hinge pins of the lid when molding a cassette case. According to the tape cassette of the present invention, the groove can easily be formed integrally, and at the same time, the slide rod is prevented from escaping from the groove.

Other objects and further features of the present invention will be apparent from the following detailed description when read in conjunction with the accompanying drawings.

BRIEF DESCRIPTION OF THE DRAWINGS

FIG. 7 is a perspective view showing a slide rod of the tape cassette;

FIG. 8 is a perspective view showing an essential part of the cassette case; and FIGS. 9A and 9B are a side view and a plan view respectively showing an essential part of the cassette case for explaining the separating direction of the dies when molding the cassette case.

DETAILED DESCRIPTION

Figure 1:
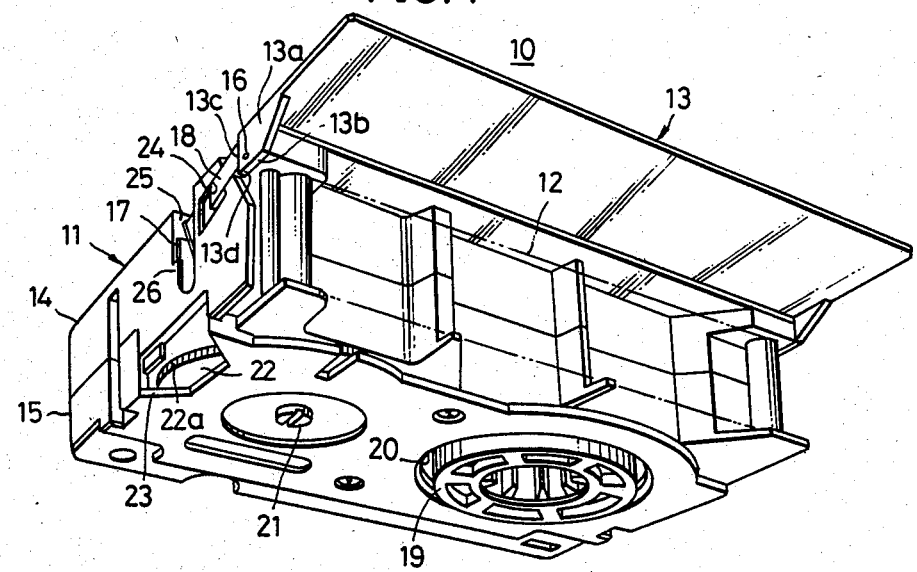
FIG. 1 is a perspective view showing an embodiment of a tape cassette according to the present invention is a state where a tape protecting lid is open, viewed from a lower direction with respect to the front of the tape cassette.
Figure 2A:
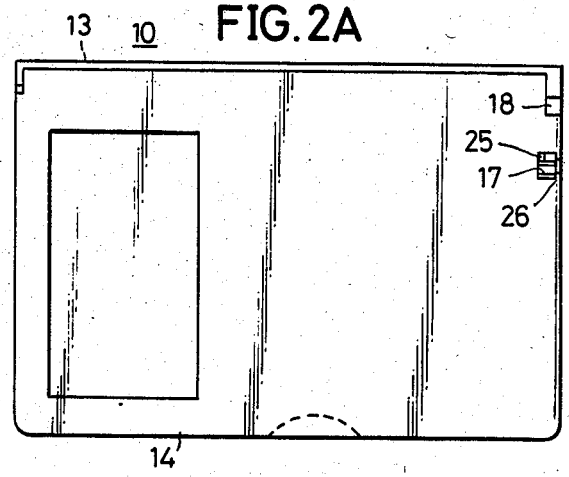
FIGS. 2A and 2B respectively are a plan view and a side view respectively showing the tape cassette shown in FIG. 1.
Figure 2B:
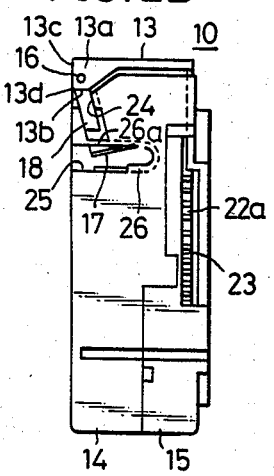

A tape cassette 10 according to the present invention has a configuration shown in FIGS. 1, 2A, and 2B. The tape cassette 10 has a cassette case 11 of a size smaller than a standard type tape cassette which is designed for a standard type recording and/or reproducing apparatus. A tape protecting lid 13 for protecting a magnetic tape 12 accommodated within the tape cassette 10, is provided on the front of the cassette case 11. In FIG. 1, the magnetic tape 12 is indicated by a two-dot chain line. The cassette case 11 consists of an upper half 14 and a lower half 15.

Side flanges 13a are integrally formed on both ends of the lid 13, and respective portions of the flange parts are axially supported by corresponding hinge pins 16 (only one shown) in the vicinity of respective corner parts of the upper half 14, so that the lid 13 is rotatable to open and close. A substantially U-shaped leaf spring 17 and a slide rod 18 which is urged towards one of the hinge pins 16 by the leaf spring 17, are provided in relation to the above lid 13. The lid 13 is angularly rotatable about the hinge pins 16, and can assume two states. That is, in one state, the lid 13 is in a closed state shown in FIG. 2B, and in another state, the lid 13 is in an open state shown in FIG. 1. When the tape cassette 10 is not loaded into a recording and/or reproducing apparatus exclusively designed for the tape cassette 10 or accommodated within a tape cassette adapter, the lid 13 covers the front of the cassette case 11 to protect the magnetic tape 12 which is exposed at the front of the cassette case 11.

In addition, a supply reel and a take-up reel are provided side by side within the cassette case 11. The supply reel is provided in a state where an annular projecting step portion 19 of a lower flange is loosely fitted into a hole 20 having a large diameter in the lower half 15. The take-up reel is provided in a rotatable manner in such a manner that a fixed shaft embedded in the lower half 15 by a screw 21, is inserted into a center hole of a reel hub. A part of a gear 22a formed at the periphery of a lower flange 22 of the take-up reel, is exposed through a cutout window 23 provided in the lower half 15.

Description will now be given with respect to a lid opening/closing structure which constitutes an essential part of the tape cassette according to the present invention, by referring to FIGS. 5A, 5B, 5C, and 6.

The side flanges 13a of the lid 13 respectively are of a rectangular shape, and have two side edges 13b and 13c with a corner part 13d formed therebetween. The slide rod 18 is provided within a guide groove 24 at the side of the upper half 14, in a freely slidable manner. The guide groove 24 extends obliquely downwards from one of the hinge pins 16. A tip end surface 18a of the slide rod 18 at the side of the lid 13 is formed perpendicular to the top surface of the cassette case 10 to meet the opposing face of one of the side flanges 13a. The U-shaped leaf spring 17 is fitted within a side groove 25 in a state held by a projecting rib 26, so that the leaf spring 17 does not easily escape from the side groove 25. A rear end surface 18b of the slide rod 18 which projects within the side groove 25 is pushed by the leaf spring 17, and the slide rod 18 is accordingly urged in the direction of an arrow A1.

Figure 6:
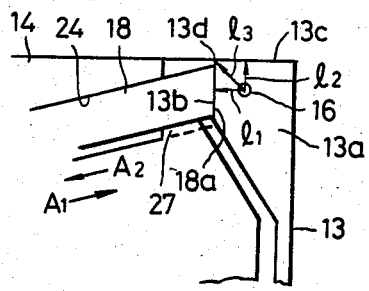
FIG. 6 is a view showing an axially supporting part of the lid shown in FIG. 5A in an enlarged scale.

If the positional relationships between the hinge pin 16 shown in the figures, the corner part 13d of the side flange 13a, and the side edges 13b and 13c are observed, as shown in an enlarged scale in FIG. 6, relations l3>l1 and l3>l2 stand where l1 is the distance between the hinge pin 16 and the side edge 13b, l2 is the distance between the hinge pin 16 and the side edge 13c, and l3 is the distance between the hinge pin 16 and the corner part 13d.

Figure 5A:
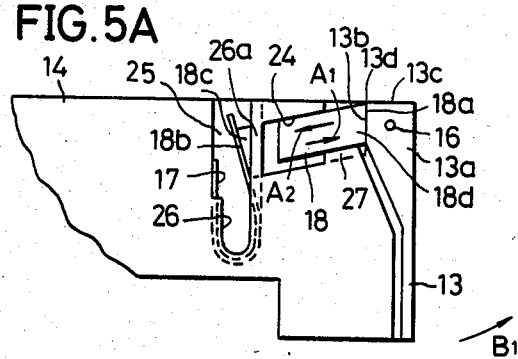
FIGS. 5A, 5B, and 5C are side views respectively showing a tape protecting lid of the tape cassette shown in FIG. 1 for exhibiting the lid in a closed state, an open state, and a state where the lid is held at a quasi-stable position.

When the lid 13 is in the closed state, the end surface 18a of the slide rod 18 makes contact with and pushes the side edge 13b of the side flange 13a along a full length of the side edge 13b which extends to both the upper and lower sides of the hinge pin 16 as shown in FIGS. 2B, 5A, and 6. Accordingly, in order to angularly rotate the lid 13 to open, the slide rod 18 must be depressed in the direction of an arrow A2 against a pressure of the leaf spring 17. Hence, the lid 13 is maintained at a vertical rotational position shown in FIGS. 2B, 5A, and 6, that is, at the closed position.

Figure 5B:
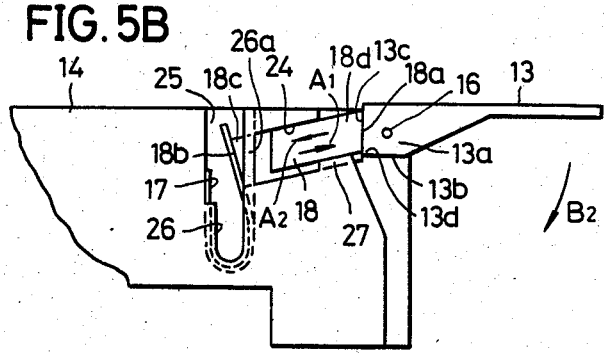

On the other hand, when the lid 13 is in the open state, the end surface 18a of the slide rod 18 makes contact with and pushes the side edge 13c of the side flange 13a along a full length of the side edge 13c which extends to both the upper and lower sides of the hinge pin 16, as shown in FIGS. 1 and 5B. Thus, the lid 13 is maintained at a horizontal rotational position shown in FIGS. 1 and 5B, that is, at the open position. Because the lid 13 is maintained open by itself, a manipulation such as accommodating the tape cassette 10 within a tape cassette adapter and drawing the magnetic tape out from the tape cassette 10, can be performed without an effort of holding the lid 13 with a finger. At the open position, the lid 13 slightly projects from the upper surface of the upper half 14.

Figure 5C:
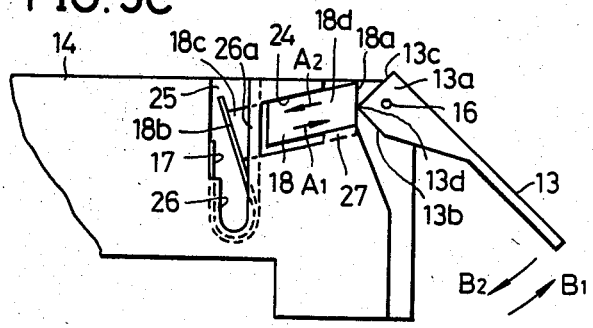

In addition, when performing the lid opening/closing operation with respect to the lid 13, the lid 13 rotates angularly so that the corner part 13d of the side flange 13a pushes the slide rod 18 away in the direction A2 against the force exerted by the leaf spring 17, as shown in FIG. 5C. When the corner part 13d exceeds the position of the hinge pin 16 along the direction of its height to reach a position above or below the hinge pin 16, the rotational force which had been applied to the lid 13 acts on the lid 13 to push the slide rod 18 which is urged by the force exerted by the leaf spring 17. Therefore, the lid 13 is rotated to the closed position shown in FIG. 5A or the open position shown in FIG. 5B, and maintained at that position. That is, when opening the lid 13 from the state shown in FIG. 5A by angularly rotating the lid 13 towards the direction of an arrow B1, the lid 13 is urged towards the lid opening direction when passing beyond an intermediate point (quasi-stable point) of rotation shown in FIG. 5C, and the lid 13 is opened completely even when the operator's finger is released. On the other hand, when closing the lid 13 from the state shown in FIG. 5B by rotating the lid 13 towards the direction of an arrow B2, the lid 13 is urged towards the lid closing direction when passing beyond the intermediate point of rotation shown in FIG. 5C, and the lid 13 is positively closed even when the operator's finger is released.

Furthermore, even when the lid 13 is partly rotated towards the lid opening direction or the lid closing direction, the lid 13 automatically returns to its original closed position to its open position when the operator's finger is released, unless the lid 13 is rotated angularly to a position beyond the intermediate point of rotation shown in FIG. 5C. Accordingly, even when the lid 13 is slightly rotated angularly towards the lid opening direction upon handling of the tape cassette 10, the lid 13 is immediately returned to its original closed position. This is a desirable feature in view of protecting the magnetic tape. Moreover, during the operation in which the tape cassette 10 is accommodated within the tape cassette adapter, the lid 13 immediately returns to its original open position when the open lid 13 is erroneously pushed by a small force, and no inconveniences are introduced.

Figure 3:
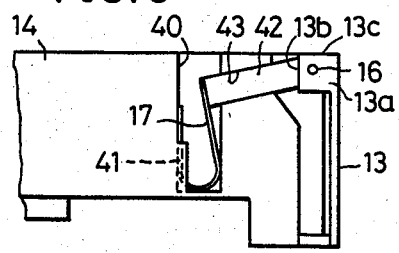
FIG. 3 is a side view of a part of a conventional tape cassette.

The conventional lid opening and closing mechanism was constructed as shown in FIG. 3. The leaf spring 17 is fitted within a side groove 40 in the upper half 14 in a state locked by a projecting rib 41 so that the leaf spring 17 does not easily escape from the side groove 40. A slide rod 42 is slidably fitted within a guide groove 43 which has a rectangular cross section. Because the slide rod 42 is simply fitted within the guide groove 43 which has a rectangular cross section and is open at the side of the upper half 14, there was a disadvantage in that the slide rod 42 could easily escape from the guide groove 43. Although the upper half 14 can be easily molded from plastic and the assembling of the cassette case 11 was simple in this conventional example, this conventional example was unsuited as a commercial product because of the disadvantage in that the slide rod 42 could easily escape from the guide groove 43.

Figure 4:
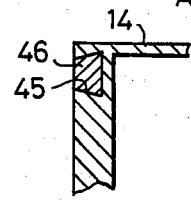
FIG. 4 shows a part of a conventional tape cassette in vertical cross section.

Thus, in order to prevent the slide rod from easily escaping from the guide groove, a guide groove 45 having a cross section shown in FIG. 4 was devised. This devised guide groove 45 is a so-called dovetail groove, wherein the width of the groove is wider towards the depth of the groove as compared to the width of the groove at the side of the upper half 14. By designing the guide groove 45 to have this configuration, a slide rod 46 is prevented from easily escaping from the guide groove 45 formed in the side of the upper half 14. However, in order to integrally form such a dovetail groove in the upper half 14 upon molding, the dies must be pulled along the extension of the dovetail groove. On the other hand, in order to integrally form the holes for supporting the pins 16 in the upper half 14, the dies must be pulled along the extensions of the holes. However, in reality, it is impossible to pull the dies in three different directions to mold the upper half 14. The holes may be formed after the upper half 14 is molded, by processes such as drilling. However, as described before, such an additional process is troublesome to carry out, and leads to disadvantages such as poor production efficiency, increased manufacturing cost, and errors in the positions of the holes.

The present invention has eliminated these disadvantages inherent to the conventional tape cassette. Description will now be given with respect to an essential part of an opening/closing lid mechanism of the tape cassette according to the present invention, by referring to FIGS. 7 and 8. The guide groove 24 has a rectangular cross section, and the side of the guide groove 24 is open at the side of the upper half 14. The rear end of the guide groove 24 is open and communicates with the side groove 25. The rib 26 which is integrally formed with the upper half 14 projects so as to cover a part of the side of the groove 25, and has a J-shape in the side view. A rib portion 26a of the long side of the rib 26, opposes a part of the side of the groove 25 in the extension of the guide groove 24. The leaf spring 17 accommodated within the groove 25 is positively prevented escaping from the groove 25, by the rib 26 which extends along both sides of the groove 25. In addition, a projecting guide wall 27 is integrally formed with the upper half 14 at a part of the side of the guide groove 24. A cutout 28 is formed between an upper plate portion 14a and a side plate portion 14b of the upper half 14, and the projecting guide wall 27 is arranged at a position corresponding to the position of the cutout 28. The hole 29 into which the pin 16 is fitted, is integrally formed with the upper half 14 at the side of the upper plate portion 14a.

The slide rod 18 comprises a substantially trapezoidal main body 18c, and is integrally formed with a projecting step part 18d at the side thereof. The thicknesses of the rib 26 including the rib portion 26a, the projecting guide wall 27, and the projecting step part 18d, are substantially of the same order. Further, the thickness of the main body 18c of the slide rod 18, is substantially of the same order as the width of an opening 24a communicating the groove 24 to the groove 25.

Upon assembly, the U-shaped leaf spring 17 is accommodated within the groove 25. Next, the slide rod 18 is fitted into the guide groove 24 from the cutout 28, with the rear end surface 18b thereof first and with the projecting step part 18d facing outwards. The leaf spring 17 is pushed by the rear end surface 18b of the slide rod 18, and the slide rod 18 is fitted into the guide groove 24 is a state where a part of the main body 18c projects within the groove 25. The lid 13 is mounted by fitting the pins 16 into the respective holes 29, in a state where the slide rod 18 is caused to slide into the groove 25 to further deform the leaf spring 17. The state shown in FIG. 5A is obtained when the assembling is completed.

In a state where the slide rod 18 is fitted into the guide groove 24, the rear part of the main body 18c of the slide rod 18 penetrates through the opening 24a and protrudes within the groove 25. In addition, the projecting step part 18d of the slide rod 18 makes contact with the top of the projecting guide wall 27. The projecting step part 18d does not interfere with the sliding of the slide rod 18 over the projecting guide wall 27, along the directions A1 and A2. The projecting step part 18d is shaped so as not to make contact with the rib portion 26a, even when the state of the lid 13 undergoes maximum change to the state shown in FIG. 5C from the state shown in FIGS. 5A or 5B.

It is not essential to provide the projecting step part 18d on the slide rod 18. However, if the projecting step part 18d is provided, the area of the end surface 18a becomes large, and the contacting area between the end surface 18a of the slide rod and the lid 13 can be set large. Moreover, when carrying out the assembling process by an automatic assembling apparatus, the assembling apparatus will hold the slide rod 18 by its projecting step part 18d, and for this reason, it is preferable to provide the projecting step part 18d on the slide rod 18.

As the lid 13 is opened and closed and the slide rod 18 slides in the directions A1 and A2, the main body 18c of the slide rod 18 is constantly restricted by the rib portion 26a and the projecting guide wall 27. Hence, the slide rod 18 is prevented from escaping from the side opening of the guide groove 24. Therefore, the slide rod 18 can smoothly slide within the guide groove 24, without escaping from the guide groove 24. The slide rod 18 can be prevented from escaping from the guide groove 24 by the rib portion 26a alone, however, the slide rod 18 is more positively prevented from escaping from the guide groove 24 by providing both the rib portion 26a and the projecting guide wall 27.

Next, description will be given with respect to the molding of the upper half 14 having the configuration described heretofore, by referring to FIGS. 8, 9A, and 9B. Upon molding, dies (sliders) 30a and 30b are used for the part of the guide groove 24 where the projecting guide wall 27 is not provided and the part of the upper plate portion 14a in the vicinity of the hole 29. The tip end of the die 30a has the shape of the guide groove 24 without the projecting guide wall 27, and the tip end of the die 30b has a pin-shaped part 31 for forming the hole 29. When separating the dies after the molding, the dies 30a and 30b are separated in the direction of an arrow B. Dies 30c and 30d are used for the groove 25 and the part of the guide groove 24 where the projecting guide wall 27 exists. The die 30c has a shape for forming the groove 25 with the rib 26, and the die 30d has a shape for forming the cutout 28 and the projecting guide wall 27. When separating the dies 30c and 30d, the dies 30c and 30d are relatively pulled in the direction of an arrow C and separated together with the whole mold.

The molding of the upper half 14 is exceedingly easy, because the rib portion 26a and the projecting guide wall 27 for preventing the slide rod 18 from escaping from the guide groove 24, are integrally formed simultaneously with the forming of the groove 25 for accommodating the leaf spring 17 and the guide groove 24 into which the slide rod 18 fits. In addition, there is no need to carry out an additional process after the molding to form the holes 29 for supporting the pins 16, since the holes 29 are also formed integrally. Moreover, the construction is exceedingly simple, because the rib portion 26a is a part of the rib 26 provided for preventing the leaf spring 17 from escaping from the groove 25.

Further, the present invention is not limited to these embodiments, but various variations and modifications may be made without departing from the scope of the present invention.

What is claimed is:

1. A tape cassette comprising:
   a cassette case for accommodating a tape therein;
   an angularly rotatable lid provided at a front of said cassette case, said lid being free to open and close; and
   a mechanism for maintaining said lid in an open state and a closed state, respectively,
   said mechanism comprising a slide rod making contact with an outer peripheral surface of said lid near a rotary fulcrum of said lid, urging means for urging said slide rod towards said outer peripheral surface of said lid so as to make contact with the said outer peripheral surface, a first groove provided in an exterior surface of said cassette case, into which said slide rod is slidably fitted, a second groove provided in the exterior surface of said cassette case for accommodating said urging means, said first and second grooves communicating with each other so that a rear part of said slide rod can enter into said second groove to permit sliding of said slide rod, and a rib portion integrally formed with said cassette case, said rib portion extending over at least an area communicating said first and second grooves to form an uninterrupted extension of the exterior surface of said cassette which covers a part of an end of said first groove and a part of a side of said second groove while leaving a portion of said first and second grooves exposed to the exterior, whereby both of said slide rod and said urging means are simultaneously prevented from escaping from said first groove and said second groove, respectively.

2. A tape cassette as claimed in claim 1 in which said rib portion extends along opposite sides of said second groove.

3. A tape cassette as claimed in claim 1 in which said mechanism further comprises a projecting guide wall integrally formed with said cassette case at a part of a side of said first groove, and said slide rod is also prevented from escaping from said first groove by said projecting guide wall.

4. A tape cassette as claimed in claim 3 in which said slide rod comprises a main body which slides within said first groove and enters within said second groove at a part thereof, and a projecting step part integrally formed with said main body, said projecting step part making contact with a top of said projecting guide wall and being guided by said projecting guide wall.

5. A tape cassette as claimed in claim 1 in which said cassette case is integrally formed with holes into which pins for supporting said lid are fitted, together with forming of said first and second grooves and said rib portion, upon molding of said cassette case.

* * * * *